July 9, 1963  D. W. HOWARD  3,096,649
BRAKE OVERTEMPERATURE DETECTOR AND INDICATOR
Filed Dec. 14, 1959  2 Sheets-Sheet 1

INVENTOR.
DONALD W. HOWARD
BY
Robert C. Smith
ATTORNEY

United States Patent Office 3,096,649
Patented July 9, 1963

3,096,649
BRAKE OVERTEMPERATURE DETECTOR
AND INDICATOR
Donald W. Howard, South Bend, Ind., assignor to The Bendix Corporation, a corporation of Delaware
Filed Dec. 14, 1959, Ser. No. 859,527
5 Claims. (Cl. 73—342)

The present invention relates to aircraft braking systems and more particularly to a system for sensing overtemperature conditions in aircraft brakes.

Aircraft brakes are typically subjected to very severe usage, particularly on large, high-performance aircraft because of high landing speeds and high weights. On turbo-jet powered aircraft these problems become more severe as a result of higher take-off and landing speeds and the typically higher gross weights, particularly of the modern jet liners. The heat energy which must be absorbed by the brakes ultimately must be dissipated into the atmosphere after a stop, but since jet aircraft brakes are not cooled by the air blast of the propeller as would be the case on piston powered aircraft or even turbo-prop powered aircraft, the dissipation time is considerably longer. During and after a stop, the heat extends from the brakes into the wheels, tires and landing gear structure and as these surrounding associated parts become hot, the additional amount of heat energy which the brakes can absorb without exceeding maximum allowable temperatures of the various components is reduced. This situation is particularly severe when repeated take-offs and landings at short time intervals do not allow sufficient cooling time for the brakes and their associated assemblies. In addition, braking stops without the use of thrust reversers adds to the load on the aircraft brakes. One of the hazards which can result from excessive heating of the brakes and associated structure is malfunctioning of the brake caused by boiling of the brake fluid. Extremely high temperatures can also damage the tires. In view of these hazards, it is very desirable to provide a brake temperature indication system which will automatically warn the pilot of an overtemperature condition. Such a warning system should be simple and durable and, preferably, should be easily installed in existing aircraft without requiring extensive structural modifications. Because sensing elements must be physically located in the landing gear itself, damage to the associated electrical connections from flying stones and other objects is always a possibility and it is therefore desirable if means can be provided to quickly check the system for continuity and for grounded leads. It is therefore an object of the present invention to provide a brake overtemperature system which will make it possible for the pilot or flight engineer of an aircraft to be aware of excessive brake temperatures so that overheating of brake fluid and other malfunctions may be avoided.

It is another object of the present invention to provide a system accomplishing the above objects in which the pilot or flight engineer may also ascertain which of several brake assemblies is overheated.

It is another object of the present invention to provide a brake overtemperature indicating system in which an overtemperature condition, once indicated, will continue to be indicated until some positive action is taken by the operator to remove the indication.

It is a further object to provide an electrical brake overtemperature indicating system having means for easily and simply checking continuity and short circuits to ground in the temperature sensing elements and associated connecting wires.

It is a further object to provide a brake overtemperature indicating system in which the indicating means is simple and not subject to malfunction or failure because of vibration or other external conditions.

It is a further object to provide a brake overtemperature system which may be easily installed in existing wheel and brake assemblies without extensive modification.

Other objects and advantages will become apparent from the following specification taken in connection with the accompanying drawings in which.

Figure 1:
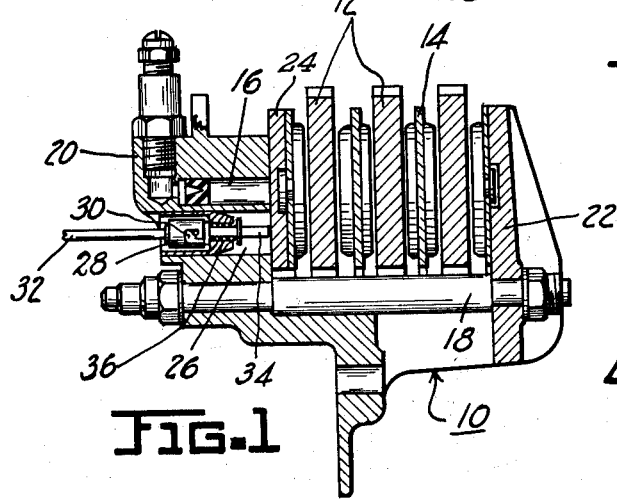
FIGURE 1 is a partial sectional view of an aircraft brake assembly showing a typical temperature sensing probe installed to sense a pressure plate temperature.

A typical aircraft brake is shown in section in FIGURE 1 at numeral 10. It consists of a plurality of interleaved rotors 12 and stators 14, which are forced together into frictional engagement by a fluid motor 16. The rotors 12 are keyed to a rotatable wheel in a manner permitting axial movement thereof. The stators are splined to keys 18 which are fixed at opposite ends to a carrier 20 and a reaction plate 22. The stator keys are circumferentially spaced around the brake. The number of these stator keys is dictated by the size and torque requirements of the brake. Axial movement of the fluid motor 16 against a pressure plate 24 causes the respective stators and rotors to be compressed together thus generating elevated temperatures which may be sufficient to cause boiling of the brake fluid which operates motor 16 or other malfunction. In order to sense these temperatures, a hole 26 has been drilled in the carrier 20 in order to permit the installation of a bayonet type fitting 28 which receives a temperature probe 30. This probe is connected by means of wires 32 to the temperature indicating device to be discussed below. The sensing element 34 of the probe 30 is maintained in contact with the axially movable pressure plate 24 by means of a spring 36. Alternatively, the sensing element 34 could be positioned to sense the temperature in the carrier itself. In some installations, both carrier and the pressure plate sensors are employed.

Figure 2:
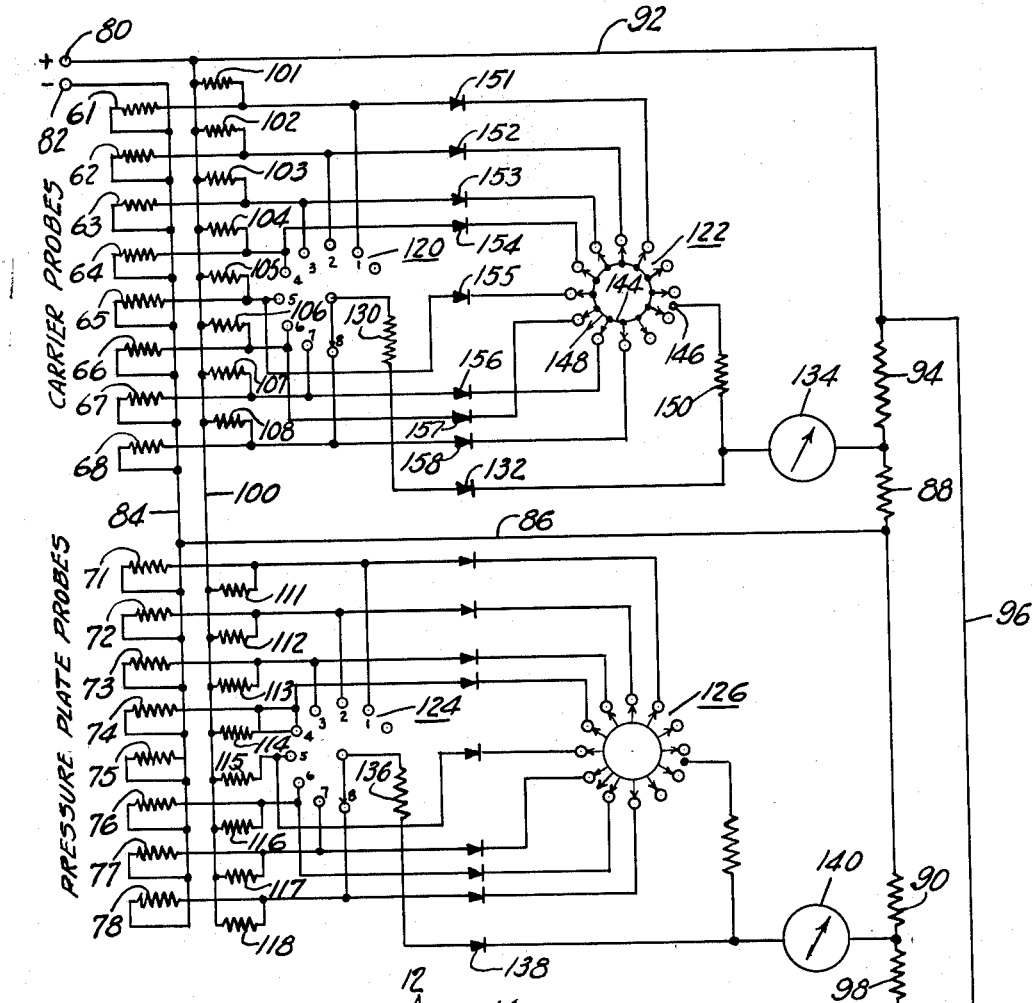
FIGURE 2 is a schematic diagram of an overall temperature sensing system in which temperatures are sensed in both the carriers and the pressure plates of the brake assemblies and in which means are provided to indicate overtemperatures in any of the brakes without identification of a particular brake or, alternatively, in any one of the brakes individually.

FIGURE 2 shows a schematic diagram of a brake overtemperature indicating system for an aircraft having landing gear including eight brake assemblies and overtemperature probes in each of carriers and pressure plates of these brake assemblies. The upper group of probes numbers 61, 62, 63, 64, 65, 66, 67 and 68 are located in the carrier portion of the brake assembly. The lower group probe numbers 71, 72, 73, 74, 75, 76, 77 and 78 are located in the brake assembly in such manner as to sense the temperature of the pressure plate substantially as indicated in FIGURE 1. All of these temperature sensing resistors, which really constitute the sensing elements in probes such as shown in FIGURE 1, are connected to a regulated direct current power source having a positive terminal 80 and a negative terminal 82. These probes are all connected to the power source in a bridge configuration. It will be observed that one side of each of the temperature sensing resistors is connected to wire 84 which is the common or low voltage side of the power supply and which is connected to terminal 82. Wire 84 is also connected to a wire 86 which is connected at its opposite end with a junction between a resistor 88 and a resistor 90. Line 86 may be considered to be the low voltage or common side of two separate bridges, one to which the carrier probes are connected and the other to which the pressure plate probes are connected. The high voltage side of the power supply is connected from terminal 80 through a wire 92 to a resistor 94 which is also connected to resistor 88. Wire 92 is also connected through to a wire 96 to the other bridge through a resistor 98 which is connected to the resistor 90. On the opposite side of the bridge the high voltage side of the power supply is connected to a wire 100 having common connections with a plurality of dropping resistors 101, 102, 103, 104, 105, 106, 107 and 108 each of which is connected with one of the corresponding temperature sensing resistors 61, 62, 63, 64, 65, 66, 67 and 68 respectively. Similarly, in the lower of the two bridges the dropping resistors 111, 112, 113, 114, 115, 116, 117 and 118 are connected to the corresponding pressure plate sensing resistors 71, 72, 73, 74, 75, 76, 77 and 78, respectively.

A plurality of switching means 120, 122, 124 and 126 are connected together on a common shaft such that when one is moved all will be moved in the same direction simultaneously. The switch connections will be discussed in relation to the positions of switch members 120 and 122, the operation of switching devices 124 and 126 being entirely analogous. With the switch members 120 and 122 connected as shown, the temperature sensing bridge which is effective in the circuit is constituted as follows: Connected in series across the voltage source between wire 100 and wires 84, 86 are the dropping resistor 108 and the sensing resistor 68. The high voltage side of the circuit is also connected through resistors 94 and 88 to the common wire 86. Connected across the bridge effectively at the mid point between resistors 108 and 68 through switch position 8 are a resistor 130, a diode 132 and a meter movement 134 and any unbalance in this bridge will be reflected in a movement of the indicator on meter 134. Resistors 88 and 94 are to be considered the reference side of the bridge, resistor 88 being a special temperature responsive resistor adapted to compensate for the temperature variations of diode 132. These two resistors remain in the circuit at all times irrespective of the manner in which the opposite side of the bridge may be constituted. Similarly, in the lower bridge circuit, the probe 78 is connected in series with dropping resistor 118 across wires 100 and 84 and the opposite side of the bridge includes, in series, resistor 98 and resistor 90. Connected across this bridge through the switch position 8 are a resistor 136, a diode 138, and a meter movement 140. Resistor 90 has a specific temperature characteristic to compensate for the temperature variation of diode 138. With the position of the switching elements as shown, the meters 134 and 140 will give an indication of the temperature sensed by probes 68 and 78 respectively. It is, of course, clear that none of the other probes are connected through the switching means to the meter movements. Similarly, the temperature sensed by any of the other probes may be selected through a movement of the pointer on switching devices 120 or 124 to any of the positions 1 through 7. When the pointer on switching members 120 and 124 is moved to the auto (automatic) position all of the positions 1 through 8 are open. Attention is now directed to switching elements 122 and 126. These elements are so designed that as the switch 120 is moved through any of its positions 1 through 8, the circuit in switching device 122, although it is closed to the center ring 144, is kept open because in none of these positions does the switching element make contact with the terminal 146. When switching member 120 is moved into the automatic position, however, the oddly spaced pointer 148 makes contact with terminal 146 and the connection is closed through a resistor 150 to the meter 134. At this time, all of the temperature sensing elements 61–68 are in communication with the center ring 144 and hence through the pointer 148, the terminal 146 and the meter 134. Now the sensing branch of the bridge includes diodes 151, 152, 153, 154, 155, 156, 157 and 158, in series with each of the probes 61 through 68, respectively. Because of the manner in which the separate probes and their respective diodes are connected, this system will respond only to the highest of all of the temperatures sensed by the probes 61–68. Assume that probe 68 is sensing the highest temperature of all of the probes. There will therefore be a higher voltage drop developed across this probe and this voltage drop will cause a current to flow through diode 158 and into the switching device 122. Thus all of the remaining diodes are operating in a condition where the voltage on the side closest the switch 122 is higher than the voltage on the probe side and none of these diodes can effectively conduct. Under these conditions, the meter 134 then indicates to the pilot or operator the highest temperature sensed by any of the probes 61–68 without regard to which specific probe is sensing this temperature. From this indication, he may then move the switch members to the positions 1 through 8 to determine which of the probes is giving the highest reading and therefore which of the brakes is overtemperature. It may be, of course, that it is the meter 140 rather than the meter 134 which indicates an overtemperature condition, and movement of the switching means through positions 1 through 8 might therefore indicate that it is a pressure plate which is overtemperature rather than one of the carriers.

Figure 3:
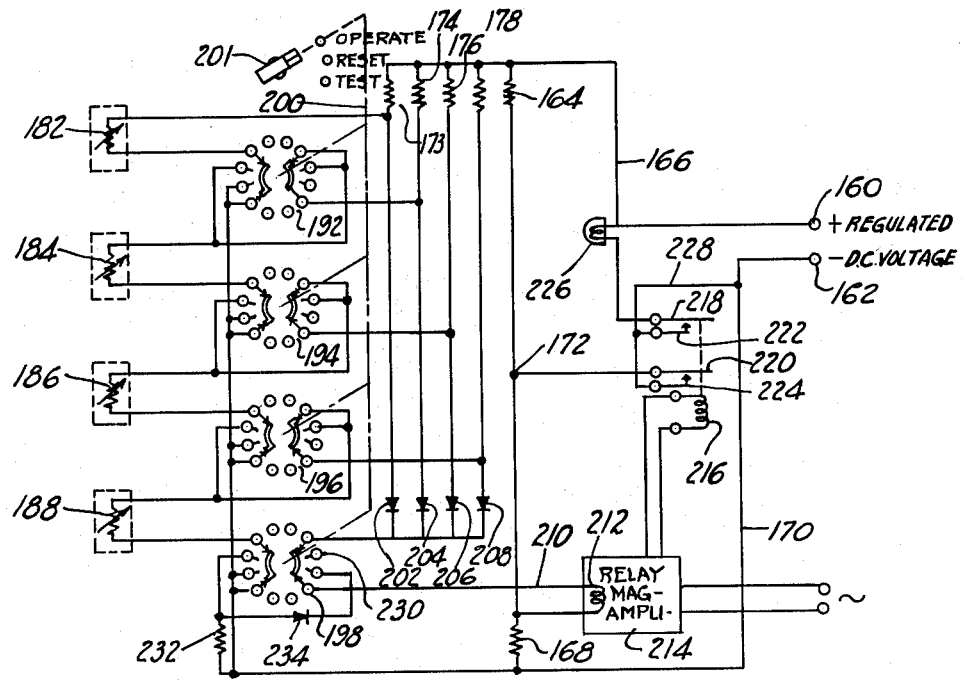
FIGURE 3 is a schematic drawing of an alternative form of my invention.

FIGURE 3 shows an alternative version of my brake overtemperature detecting system which is simplified to show only one set of sensors which may be located either in the carriers or the pressure plates, as desired. In this system, a bridge circuit similar to that of FIGURE 2 is connected to a regulated direct current voltage source at terminals 160 and 162, terminal 160 being connected to the plus side of the supply and terminal 162 being connected to the minus side of the supply, as shown. The reference side of the bridge consists of a resistor 164 connected through a wire 166 with terminal 160 and a resistor 168 connected through a wire 170 with terminal 162. These resistors are connected together at a junction 172. The opposite side of the bridge consists of a plurality of dropping resistors 173, 174, 176 and 178 and their corresponding probes or temperature sensing resistors 182, 184, 186 and 188 respectively. All of these temperature probes are interconnected with a plurality of switching devices 192, 194, 196 and 198. The common operating shaft of the switching devices is shown as a mechanical linkage 200 operated by means of the switch 201. With the switch 201 in the "operate" position as shown, all of the probes 182, 184, 186 and 188 and their corresponding dropping resistors 172–178, respectively, are connected in parallel on the opposite side of the bridge from the calibrating resistors 164 and 168. Connected across the bridge between each of the dropping resistors and its corresponding sensing resistor are diodes 202, 204, 206 and 208 which are connected through switch element 198 to a wire 210 connected with an input winding 212 of the relay magnetic amplifier 214. The opposite side of winding 212 is effectively connected with the junction 172 between the calibrating resistors 164 and 168. The relay magnetic amplifier 214 provides a signal to energize a relay winding 216 and this winding, when energized causes contacts 218 and 220 to be moved into contact with stationary contacts 222 and 224, respectively. When these contacts have closed, a lamp 226 which is connected to the power supply terminal 160 on one side, is then connected through wire 228 with the negative terminal 162, thus causing it to be lighted. At the same time the junction point 172 is connected through the wire 228 to the terminal 162. This effectively removes the bucking reference voltage across the resistor 168 from the input to the relay magnetic amplifier and the amplifier simply receives the output from the temperature sensing side of the bridge, thus causing the relay winding 216 to remain energized and hold the contacts 218 and 220 closed against their respective stationary contacts. It will therefore be clear that once the reference voltage set up by the reference side of the bridge is exceeded by any of the temperature sensing resistors 182–188, a signal will be supplied to the magnetic amplifier tending to energize winding 216 and closing the contacts 218 and 220. This causes the warning lamp 226 to be lighted and also it causes the reference signal to be removed from the circuit thereby assuring a substantial input signal to the relay magnetic amplifier and holding the relay closed preventing the lamp 226 from being turned out. It is then necessary for the pilot or other operator to take a positive step to reset the system so that the warning light 226 will be turned off. By moving the switch 201 to the reset position the input to the relay magnetic amplifier is opened as is demonstrated by the fact that the contact 230 to which the conducting member of the switch 198 is then connected, is open and does not connect with wire 210. Under these conditions, there is no input to the winding 212 of the relay magnetic amplifier and the winding 216 is deenergized thus permitting the contacts 218 and 220 to be opened. Should an overtemperature condition still exist, the relay magnetic amplifier will again be actuated by a positive temperature error signal and the warning lamp 226 will again be iluminated when the switch is moved back to the "operate" position. If the lamp 226 is not relighted, the operator may then conclude that the overtemperature condition initially sensed no longer exists.

Because of the possibility that any of the temperature sensing probes 182–188 or the connections thereto may be damaged in operation a position has been established on the switching means, 192–198 which enables the operator to check the sensing elements and their connections for continuity and for short circuits to ground. When the switch 201 is rotated to the test position shown, all of the sensing elements 182–188 are connected in series with each other and with an additional resistor 232 which is in communication through wire 170 with the negative side of the power supply. When all of these probes plus the resistor 232 are connected in series, as indicated, a very substantial input signal is supplied to the control winding 212 of the relay magnetic amplifier and the warning lamp 226 is illuminated. Should any of the probes or their connections be opened, there will be an insufficient voltage supplied to the magnetic amplifier to operate the warning light, thus indicating a malfunction. Also, should any of the probes or their connecting wires be shorted to ground (or, effectively, to the negative side of the direct current voltage supply), a substantial part of the voltage drop across the entire side of the bridge will be lost and the signal will again be insufficient to actuate the relay magnetic amplifier and hence, the warning lamp 226. A diode 234 prevents actuation of the relay magnetic amplifier by a current in the reverse direction through the control winding should the probe circuit be open or grounded.

Figure 4:
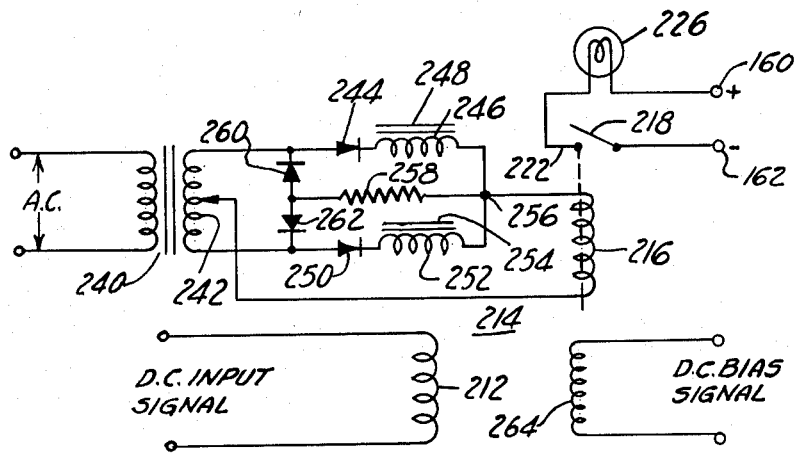
FIGURE 4 is a schematic diagram of the relay magnetic amplifier used in the system of FIGURE 3.

The details of the bistable relay magnetic amplifier 214 are shown schematically in FIGURE 4. Alternating current power is supplied to a transformer 240 having a center tapped secondary winding 242. Connected to one end of the winding 242, is a first amplifier branch consisting of a diode 244 and a power winding 246 which is inductively related with a core 248. Connected to the opposite end of the transformer secondary winding 242 is a second branch containing a diode 250, a power winding 252, inductively related with the core 254. These two branches are connected together at a terminal 256. The output of the magnetic amplifier which is the relay winding 216 is connected between terminal 256 and the center tap of winding 242. Also connected to terminal 256 is a resistor 258 having connections at its opposite end with a diode 260 connected to the first branch of the amplifier and a diode 262 connected with the second branch of the amplifier. The direct current input signal is supplied to winding 212 which is wound in inductive relationship with both of cores 248 and 254. A direct current bias signal is supplied to a winding 264 which is wound in inductive relationship with both of cores 248 and 254. To understand the operation of this relay magnetic amplifier, it will first be assumed that the instantaneous polarity of the alternating current supplied to the transformer 240 is such that the top end of the secondary winding 242 is positive. Current will then flow through the diode 244, the winding 246, terminal 256, and the relay winding 216 back to the center tap. From terminal 256 there will also be parallel flow through the resistor 258 and the diode 262 back to the lower side of secondary winding 242. When the lower side of secondary winding 242 is positive, flow will occur through the diode 250, the power winding 252, the terminal 256, and the relay winding 216 back to the center tap. Flow will also occur through the resistor 258 and the diode 260 back to the upper side of the secondary winding. In the absence of a signal on the control winding 212 large enough to overcome the bias signal on bias winding 264, the power windings 246 and 252 absorb substantially all of the voltage drop impressed across them and there is very little current flow through the relay winding 216. Under these conditions, the switch 218 will be held open. When an input signal flows into winding 212, large enough to cause the cores 248 and 254 to saturate, and the average voltage drop across the windings 246 and 252 is substantially reduced and a higher average voltage drop must then necessarily appear across the relay winding 216. The level of input signal where this occurs may be established by the amount of bias signal supplied to the bias winding 264. In the above discussion relating to FIGURE 3, it was pointed out that the circuit was designed to maintain the relay 216 closed once it had been actuated until the switch 201 was moved to the reset position. In order to assure this operation, it is necessary that the circuit be so designed that the relay, once actuated, remains in operation until the output voltage of the magnetic amplifier reaches a very low value. This value is much below that required to initially actuate the relay. Consider now a situation in which the relay is energized and the switch member 218 is closed against contact 222 and the direct current input signal is then diminished substantially to a point where it must be considered that the windings 246 and 252 are no longer gating. There is, nevertheless, a rather significant magnetizing current flow through these windings and through the load 216. The resistor 258 and diodes 260 and 262 which are connected to terminal 256 operate to establish a threshold voltage value at which the relay 216 will become sufficiently deenergized to open the switch member 218.

Although only two embodiments have been shown and described in detail, it will be recognized that other modifications are within the scope of the present invention. Obviously the warning lamp system and the testing system of FIGURE 3 may be used in the embodiment of FIGURE 2, if desired. As previously indicated, the location of the temperature sensing probes is a matter of the individual requirements of any given system.

I claim:

1. In a brake overtemperature detector for aircraft landing gear including a plurality of wheels and associated brake assemblies said assemblies including carriers and pressure plates, the combination comprising a source of direct current voltage, an electrical bridge circuit connected to said source including a first resistive branch and a second resistive branch connected in series across said source, a third resistive branch and a fourth branch connected in series across said source in parallel with said first and second branches, said fourth branch including a temperature sensing resistive element located in one of said carriers, and a resistor, a diode and a meter movement connected across said bridge such that said meter movement will indicate overtemperature conditions sensed by said temperature sensing element, a plurality of temperature sensitive resistors in the remainder of said carriers, a dropping resistor connected to each of said temperature sensitive resistors, first switching means operative to connect any one of said dropping resistors and its corresponding temperature sensing resistor into said third and fourth branches respectively, a diode connected in series with each of said temperature sensitive resistors, a second switching means operable to connect all of said temperature sensing resistors through said diodes to said meter movement such that said meter movement reflects the highest temperature sensed by any of said temperature sensing resistors, and means connecting said first and second switching means together for simultaneous operation.

2. A brake overtemperature detector as set forth in claim 1 including a second electrical bridge circuit connected to said source identical with said first named electrical bridge circuit wherein said temperature sensitive resistors are positioned in said pressure plates, and a resistor, a diode and a second meter movement are connected across said second bridge circuit such that said meter movement will sense overtemperature conditions sensed by the temperature sensitive resistors, in said pressure plates, third switching means operable to connect any one of said temperature sensitive resistors and its associated dropping resistor into said bridge circuit, a diode connected in series with each of said temperature sensitive resistors, a fourth switching means operable to connect all of said temperature sensitive resistors through said diodes to said meter movement such that said meter movement reflects the highest temperature sensed by any of said resistors, and means connecting said third and fourth switching means with said first and second switching means for simultaneous operation.

3. A brake overtemperature detector as set forth in claim 2 wherein one of said first and second resistive branches in each of said electrical bridge circuits includes a resistor having ambient temperature characteristics compensated to offset the temperature characteristics of the diode connected in series with each of said meters.

4. In a brake overtemperature detector for aircraft landing gear, a plurality of wheels and associated brake assemblies including carriers and pressure plates, the combination comprising a voltage source, a warning light connected to said voltage source, a relay for actuating said warning light, a bistable magnetic amplifier for controlling said relay, means providing an input signal to said magnetic amplifier including a bridge circuit connected to said source having a first resistive branch and a second resistive branch connected in series across said source, a third resistive branch and a fourth branch connected in series across said source in parallel with said first and second branches, said fourth branch including a plurality of temperature responsive circuits connected in parallel, each of said circuits including, in series, a resistive element physically positioned in one of said carriers whose resistivity varies with temperature and a diode such that said fourth branch always indicates the highest temperature sensed by any of the plurality of temperature sensitive elements, and switching means connected to each of said temperature sensitive elements operative when in a first position to connect all of said elements in parallel for providing an input signal to said bistable magnetic amplifier representing the highest temperature sensed by any of said elements, when in a second position to connect all of said temperature sensitive elements in series with each other and with an additional resistance device such that a high voltage drop will be developed across the combined resistance to cause said magnetic amplifier to operate said warning light and an open circuit or a connection to ground in any of said elements or connection thereto will cause an insufficient input voltage to said magnetic amplifier to operate said warning light, and operative when in a third position to disconnect all of said temperature elements from the input to said magnetic amplifier to permit said bistable magnetic amplifier to be reset to a value of saturation sufficiently low that said relay will be deenergized.

5. A brake overtemperature detector as set forth in claim 4 wherein said magnetic amplifier includes a power transformer having a center-tap secondary winding, a first branch comprising, in series, a diode and a power winding with its associated reactor connected to one end of said secondary winding, a second branch comprising, in series, a diode in a power winding with its associated reactor connected to the other end of said secondary winding, and a control winding in inductive relationship with said power windings, the winding of said relay being connected across the output of said magnetic amplifier.

References Cited in the file of this patent

UNITED STATES PATENTS

| | | |
|---|---|---|
| 2,246,575 | Coleman | June 24, 1941 |
| 2,456,499 | Fritzinger | Dec. 14, 1948 |
| 2,800,018 | Phillips | July 23, 1957 |
| 2,894,198 | McDonald | July 7, 1959 |

FOREIGN PATENTS

| | | |
|---|---|---|
| 692,064 | Great Britain | May 27, 1953 |

OTHER REFERENCES

I. T. and T. Corp. "Reference Data for Radio Engineers," 4th Ed., 1956, p. 328 relied on. Copy in Sci. Lib.